(12) United States Patent
Safaee-Rad et al.

(10) Patent No.: US 8,704,895 B2
(45) Date of Patent: Apr. 22, 2014

(54) FAST CALIBRATION OF DISPLAYS USING SPECTRAL-BASED COLORIMETRICALLY CALIBRATED MULTICOLOR CAMERA

(75) Inventors: Reza Safaee-Rad, Etobicoke (CA); Milivoje Aleksic, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 13/597,029

(22) Filed: Aug. 28, 2012

(65) Prior Publication Data

US 2013/0050504 A1 Feb. 28, 2013

Related U.S. Application Data

(60) Provisional application No. 61/528,598, filed on Aug. 29, 2011.

(51) Int. Cl.
*H04N 17/02* (2006.01)

(52) U.S. Cl.
USPC ............................................. 348/189; 348/182

(58) Field of Classification Search
USPC ........... 348/189–191, 180, 181, 177–179, 92, 348/93, 129; 445/3, 63, 64; 345/904, 600, 345/601
See application file for complete search history.

(56) References Cited

U.S. PATENT DOCUMENTS

| | | | |
|---|---|---|---|
| 6,933,967 B2 * | 8/2005 | Doyle et al. | 348/189 |
| 7,570,282 B1 * | 8/2009 | Kaplinsky | 348/188 |
| 7,728,845 B2 | 6/2010 | Holub | |
| 7,755,671 B2 | 7/2010 | Wang et al. | |
| 7,940,329 B2 * | 5/2011 | Houmeau et al. | 348/383 |
| 8,174,626 B2 * | 5/2012 | Ouchi | 348/745 |
| 2003/0193564 A1 * | 10/2003 | Jenkins | 348/182 |
| 2003/0193566 A1 * | 10/2003 | Matsuda et al. | 348/189 |
| 2004/0114041 A1 * | 6/2004 | Doyle et al. | 348/182 |
| 2006/0187469 A1 * | 8/2006 | Kawasue et al. | 356/611 |
| 2006/0204068 A1 * | 9/2006 | Marcelpoil et al. | 382/129 |
| 2007/0216704 A1 | 9/2007 | Roberts et al. | |
| 2007/0216772 A1 * | 9/2007 | Xu et al. | 348/189 |

(Continued)

OTHER PUBLICATIONS

International Search Report and Written Opinion—PCT/US2012/052815—ISA/EPO—Feb. 28, 2013.

(Continued)

*Primary Examiner* — Victor Kostak
(74) *Attorney, Agent, or Firm* — Knobbe Martens Olson and Bear, LLP (57) ABSTRACT

Described are a system and method to calibrate displays using a spectral-based colorimetrically calibrated multicolor camera. Particularly, discussed are systems and methods for displaying a multicolor calibration pattern image on a display unit, capturing the multicolor calibration pattern image with a multicolor camera having a plurality of image sensors, with each image sensor configured to capture a predetermined color of light, comparing a set of reference absolute XYZ coordinates of a set of colors from the multicolor calibration pattern with a set of measured XYZ color coordinates captured using the colorimetrically calibrated camera, and calibrating the display unit based on the comparison between the reference coordinates and the measured coordinates.

20 Claims, 4 Drawing Sheets

(56) References Cited

U.S. PATENT DOCUMENTS

| | | | |
|---|---|---|---|
| 2009/0086292 A1* | 4/2009 | Klassen | 358/504 |
| 2009/0122132 A1* | 5/2009 | Thielman | 348/14.08 |
| 2009/0167782 A1 | 7/2009 | Petljanski et al. | |
| 2009/0296113 A1* | 12/2009 | Mestha et al. | 358/1.9 |
| 2010/0123784 A1* | 5/2010 | Ding et al. | 348/189 |
| 2011/0176007 A1* | 7/2011 | Ding et al. | 348/189 |
| 2011/0267629 A1* | 11/2011 | Fan et al. | 358/1.9 |
| 2011/0316973 A1* | 12/2011 | Miller et al. | 348/43 |
| 2012/0074851 A1 | 3/2012 | Erinjippurath | |
| 2012/0127324 A1* | 5/2012 | Dickins et al. | 348/191 |
| 2013/0120589 A1* | 5/2013 | Chang et al. | 348/189 |

OTHER PUBLICATIONS

"Colorimeters and Photometers", XP055078296, Aug. 24, 2011; 3 pages.

ELDIM: "Quality control imaging devices: Isense & Isense-Color", Advanced Light Analysis, XP055078297, Aug. 24, 2011; 8 pages.

Second Written Opinion from International application No. PCT/US2012/052815, dated Sep. 18, 2013, 5 pp.

* cited by examiner

FAST CALIBRATION OF DISPLAYS USING SPECTRAL-BASED COLORIMETRICALLY CALIBRATED MULTICOLOR CAMERA

CROSS-REFERENCE TO RELATED APPLICATIONS

The application claims the priority benefit of U.S. Provisional Application No. 61/528,598, entitled "SPECTRAL-BASED CALORIMETRIC CALIBRATION OF A 3CCD COLOR CAMERA FOR FAST AND ACCURATE CHARACTERIZATION AND CALIBRATION OF LCD DISPLAYS," filed Aug. 29, 2011, the entirety of which is incorporated herein by reference.

BACKGROUND

1. Technical Field of the Invention

One aspect of the invention relates to calibration of electronic displays, and in particular, to methods and systems for the calibration of electronic displays utilizing a multicolor camera.

2. Description of the Related Art

Electronic displays, such as those used in cellular telephones, computers and tablets may exhibit a significant amount of variability in their tone-responses, color responses and backlight-modulation responses. This is mainly due to variability in characteristics of various optical components used in manufacturing of the displays including variability in spectral power distribution (SPD) of LED backlights.

Thus, it is typical to calibrate each electronic display that is manufactured on a manufacturing line so that each display provides an accurate tone-response, color response and backlight-modulation response during use. Display characterization and calibration using a spectrometer or a color meter, however, can lead to two basic deficiencies. First, these color meters can only generate calibration data based on a single spot on the display (usually at panel center). Second, it generally takes a significant amount of time to do the required measurement because the display screen may need to be separately calibrated to have an accurate response for a plurality of different colors, whereas the calibration is only performed for one color at a time. For example, a Red/Green/Blue tone response for a liquid crystal display (LCD) may take up to 15 seconds per digital input level using a Photo Research PR-655 spectrometer, which only measures one wavelength of light at a time. The entire calibration process for a single display may take up to a total of about 48 minutes for a 6-bit per channel LCD display that needs to be evaluated and calibrated based on 192 test patterns of different shapes and colors.

SUMMARY OF THE INVENTION

Some of the embodiments may comprise a method for calibrating a display unit. The method may comprise displaying a multicolor calibration pattern image on a display unit. The method may further comprise capturing the multicolor calibration pattern image displayed on the display unit with a multicolor colorimetrically calibrated camera having a plurality of image sensors, with each image sensor configured to capture a predetermined color of light. The method may further comprise comparing a set of reference absolute XYZ coordinates of a set of colors from the multicolor calibration pattern with a set of measured XYZ color coordinates captured using the colorimetrically calibrated camera and calibrating the display unit based on the comparison between the reference coordinates and the measured coordinates. In other embodiments, the method may further comprise determining whether the comparison between the reference absolute XYZ coordinates of a set of colors and the measured XYZ color coordinates is within acceptable color error. In some embodiments, acceptable color error may be less than 1 CIE DE2000 unit. In other embodiments, the method may further comprise performing a spectral-based calibration of the multicolor camera. In some embodiments, the multicolor calibration pattern image may comprise a plurality of single color images. In other embodiments, the method may be performed in less than 5 seconds.

Other embodiments may comprise a system for calibrating a display unit comprising a multicolor camera configured to capture red, green, and blue colors on separate image sensors, with each image sensor configured to capture a predetermined color of light. The system may further comprise a panel driver configured to generate color pattern images on a display unit being calibrated. The system may further comprise a calibration module configured to set calibration values to adjust the colors being shown on the display. In other embodiments, the system may further comprise a comparison module configured to compare a set of reference absolute XYZ coordinates of a set of test colors with a corresponding set of measured XYZ color coordinates captured using a colorimetrically calibrated camera and determine whether an acceptable color error is achieved. In some embodiments, acceptable color error may be less than 1 CIE DE2000 unit. In other embodiments, the system may further comprise an image capture module configured to spectrally calibrate a multicolor camera prior to capturing color pattern images on a display unit.

Other embodiments may include a non-transitory computer readable medium containing processor executable instructions that are operative to cause a processor to display a multicolor calibration pattern image on a display unit, capture the multicolor calibration pattern image displayed on the display unit with a multicolor camera having a plurality of image sensors, with each image sensor configured to capture a predetermined color of light, compare reference absolute XYZ coordinates of a set of colors with a set of measured XYZ color coordinates captured using the colorimetrically calibrated camera; and calibrate the display unit based on the comparison between the reference coordinates and the measured coordinates. Other embodiments further comprise executable instructions operative to cause a processor to determine whether the comparison between the reference absolute XYZ coordinates of a set of colors and the measured XYZ color coordinates is within acceptable color error. Other embodiments further comprise executable instructions operative to cause a processor to perform a spectral-based calibration of the multicolor camera.

BRIEF DESCRIPTION OF THE DRAWINGS

The disclosed aspects will hereinafter be described in conjunction with the appended drawings, provided to illustrate and not to limit the disclosed aspects, wherein like designations denote like elements.

DETAILED DESCRIPTION

Implementations disclosed herein provide systems, methods and apparatus for calibrating a display unit using a multicolor camera. Particularly, some embodiments described herein incorporate a spectrally calibrated multicolor camera to capture images of a multicolor calibration pattern displayed on a display unit and apply a calibration adjustment to the display unit. One embodiment includes displaying more than one calibration pattern on the display unit at one time. Other embodiments include performing a spectral-based calibration of the multicolor camera prior to acquiring images of the calibration pattern displayed on the display unit. One skilled in the art will recognize that these embodiments may be implemented in hardware, software, firmware, or any combination thereof.

Accordingly, one embodiment may include a system for rapidly calibrating electronic displays. In this embodiment, a multicolor camera, such as a multicolor camera having three charge coupled devices (3CCD) is used to evaluate color test patterns displayed on the electronic display being tested. In this embodiment, an image analysis system is linked to the 3CCD camera and the display, and outputs a series of single color, or multicolor test patterns on the display. Because the 3CCD camera has three separate image sensors for three Red, Green and Blue color bands it can separately measure the color responses for the three RGB bands simultaneously. This removes significant color crosstalk that exists between RGB channels of a camera with a single Bayer-type RGB color sensor (which requires RGB color interpolation) and thus provides more accurate image capture and more accurate color measurement. As well, compared to a camera that uses a single sensor with a set of a mechanical color wheel filters, a 3CCD camera is desirably much faster in terms of capturing images and providing color measurements.

In the following description, specific details are given to provide a thorough understanding of the examples. However, it will be understood by one of ordinary skill in the art that the examples may be practiced without these specific details. For example, electrical components/devices may be shown in block diagrams in order not to obscure the examples in unnecessary detail. In other instances, such components, other structures and techniques may be shown in detail to further explain the examples.

It is also noted that the examples may be described as a process, which is depicted as a flowchart, a flow diagram, a finite state diagram, a structure diagram, or a block diagram. Although a flowchart may describe the operations as a sequential process, many of the operations can be performed in parallel, or concurrently, and the process can be repeated. In addition, the order of the operations may be re-arranged. A process is terminated when its operations are completed. A process may correspond to a method, a function, a procedure, a subroutine, a subprogram, etc. When a process corresponds to a software function, its termination corresponds to a return of the function to the calling function or the main function.

Those of skill in the art will understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

In the context of the present invention, the term "calibration" refers to measuring separate red, green, and blue tone response over the entire dynamic range. For example, on a 24 bit display, calibration refers to measuring at least 16 levels for each RGB channel. Calibration of a display desirably further involves performing tone response and gray tracking correction such that at all gray levels, average color error is not greater than two CIE DE2000 units. Calibration of a display may further involve performing color error measurements for at least 18 test colors such that the average color error is less than one CIE DE2000 unit.

The techniques of this disclosure may be applicable to a variety of different display devices, including backlit devices (also commonly referred to as transmissive displays), frontlit displays, reflective displays and self-illuminating displays, such as LED and OLED devices. Exemplary devices include digital televisions, wireless communication devices, personal digital assistants (PDAs), laptop or desktop computers, digital cameras, video cameras, digital media players, video gaming devices, cellular or satellite radio telephones, smartphones, tablets or any device having a display.

The techniques disclosed herein may be applicable to any type of display that has luminance, chrominance and/or backlight adjustment capabilities. These techniques may apply calculated calibration parameters and thereafter making different adjustments to calibrate the display in order to provide a display that forms accurate representations of real-world colors to a user. Specifically, different color correction matrices may be generated and applied for different settings in the display in order to achieve desirable adjustments to the device. The adjustments described herein may address chrominance shifts due to different backlight settings as well as inter-color channel cross-talk. Cross-talk may be caused by an effect that one color channel has on another color channel, and cross-talk may vary in the different backlight settings. The techniques described herein for addressing cross-talk may be applicable to backlight display devices, other types of displays that have luminance adjustment capabilities, and even for display devices that have static luminance output. In general, RGB cross-talk may be due to at least two factors: optical (e.g., RGB filters) crosstalk and electrical RGB crosstalk.

In one example, this disclosure describes color correction techniques for display devices that employ backlight modulation. Changes in backlight level can result in spectral shifts in the color output of a display. In another example, this disclosure relates to color-correction techniques for correcting colors in non-backlit display devices.

Color response may generally refer to the color output of the display in response to a given set of color input data. More particularly, color response may refer to color output of the display produced by a combination of color channels, e.g., red (R), green (G) and blue (B), in response to color image data specifying pixel values for the color channels. The techniques of this disclosure may apply both tone adjustments and color adjustments. Tone adjustments may essentially adjust for inaccuracies in luminance, while color adjustments may adjust for inaccuracies in chrominance. As noted above, color adjustments may address both color shifts due to different backlight settings, and cross-talk among the color channels, which may be different at different backlight settings. Both the tone adjustments and color adjustments may comprise adjustments to color components, e.g., R, G, B values, which are used to drive the display.

In some examples, calibration may involve determining appropriate gamma correction for different color channels based on the tone response of a display being calibrated. The gamma correction may be selected to produce desired tone or luminance output for each one of the different color channels. Calibration for the display color response may be then performed at different levels of backlight. In some examples, the color response may be calibrated with reference to a set of calibration color values, which may be arranged as color patches, e.g., such as those provided in the well-known Macbeth color checker test chart.

Figure 1:
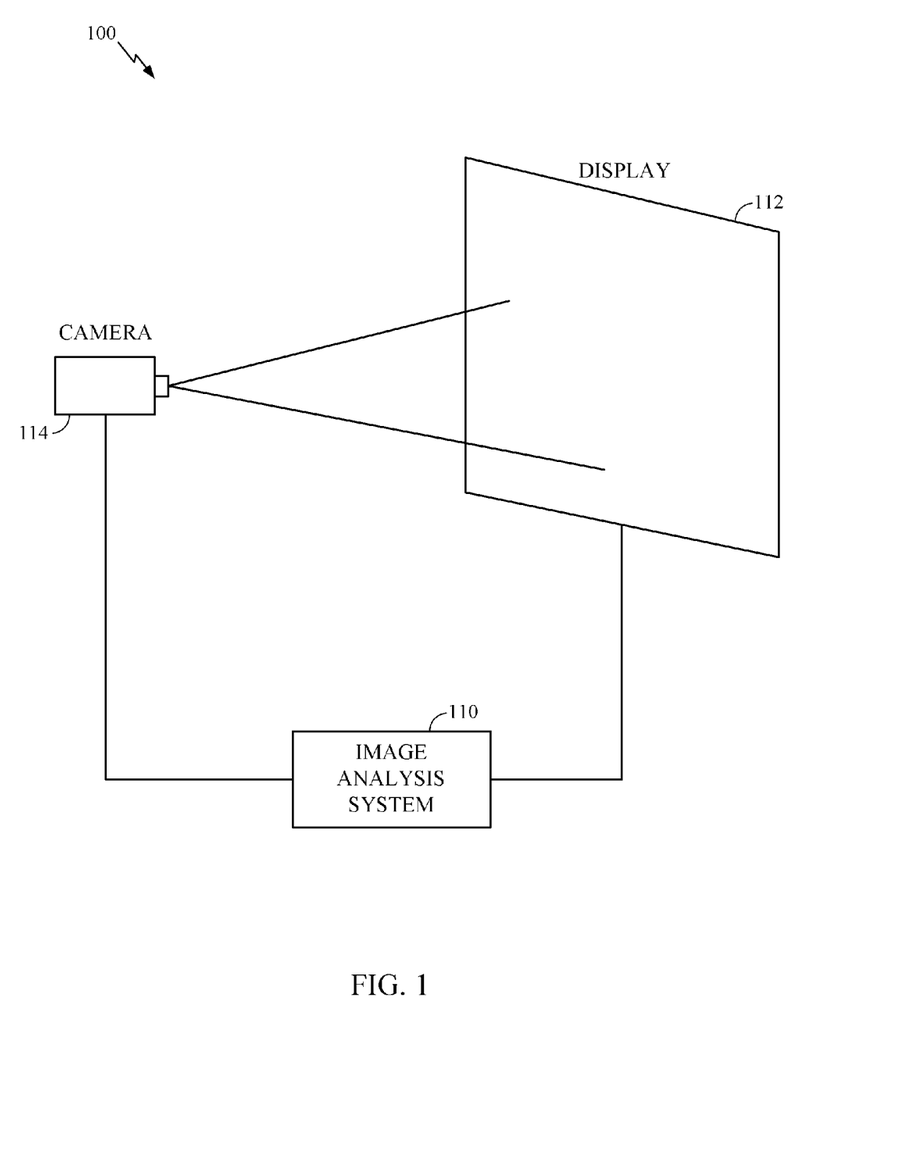
FIG. 1 is a schematic diagram depicting an image analysis system of one embodiment of the invention.

FIG. 1 depicts a schematic of one embodiment of a display unit display characterization and calibration (DCC) system 100 including an image analysis system 110 linked to a display unit 112 and a multicolor camera 114. The multicolor camera 114 may be spectrally-calibrated such that it can measure colors and provide absolute XYZ color coordinates. Image analysis system 110 may be a stationary device such as a desktop personal computer or the like or it may be a mobile unit. A plurality of applications may be available to the user on image analysis system 110.

As shown in FIG. 1, the image analysis system 110 links the display unit 112 needing calibration to the multicolor camera 114. Because the display unit 112 is in electrical communication with the multicolor camera 114, a feedback loop can be initiated, as discussed below, that allows the image analysis system 110 to properly calibrate the display unit 112. The multicolor camera can be colorimetrically calibrated such that RGB values in the captured image are mapped to XYZ absolute color coordinates through numerical processing. A test color in a calibration pattern has an XYZ absolute coordinate which maps to an RGB coordinate based on the assumed color gamut. After the test color is displayed on the display unit 112 and an image is captured by the multicolor camera 114, RGB values of the test color are extracted from the captured image. Then, through numerical processing by the image analysis system 110, XYZ coordinates of the test color are calculated. Color error is then defined between the calculated XYZ coordinate and the reference XYZ coordinates of a test color.

Display characterization and calibration (DCC) may be performed (e.g., by a device manufacturer) to determine the appropriate color correction matrices for a particular display panel and/or a device. In some examples, DCC may be performed for a general class of devices (e.g., a particular model number). In other examples, DCC may be performed on individual devices. Thus, DCC may be performed at the time of device manufacturing. In one embodiment, DCC produces data for color- and gamma-correction, and the produced data is then stored in each corresponding device for use by the device processor to perform color correction and gamma correction as the display in being used by a user. In one embodiment, the display calibration data is stored as a matrix in a memory associated with the display unit 112. The correction may account for both chromaticity shifts due to different backlight levels, as well as cross-talk between channels, which may also be affected by the different backlight levels.

DCC may take into consideration display tone response and display color response. Characterization and calibration may be performed at different display operating conditions, e.g., fixed backlight level and variable backlight levels. DCC may include characterization of the display through measurement, calibration through gamma and color correction matrices, and verification through linearity and color error checks.

Therefore, in one embodiment the system has four main components. The first component is a camera that captures accurate RGB color images, wherein the RGB values are then mapped to absolute color coordinates through numerical processing in an electronic system such as a personal computer.

The second component is an electronic system, such as a personal computer that functions as a master and controls the camera through a first interface and the display/display-processor being calibrated using a second interface. The third component is a display processor chip, such as those manufactured by Qualcomm, Inc. (San Diego, Calif.) that processes an image before it is rendered on a display. This display processor may also be used to generate test color or test patterns directly within the display device. Thus, it may not be necessary to generate test colors/patterns separately by the connected system and then upload them to the display. This may save a significant amount of time in the display calibration process. The final component is a display unit being tested. Typically, the display screen and the graphics processor are integrated into a single device, such as a cell phone or a tablet.

Figure 2:
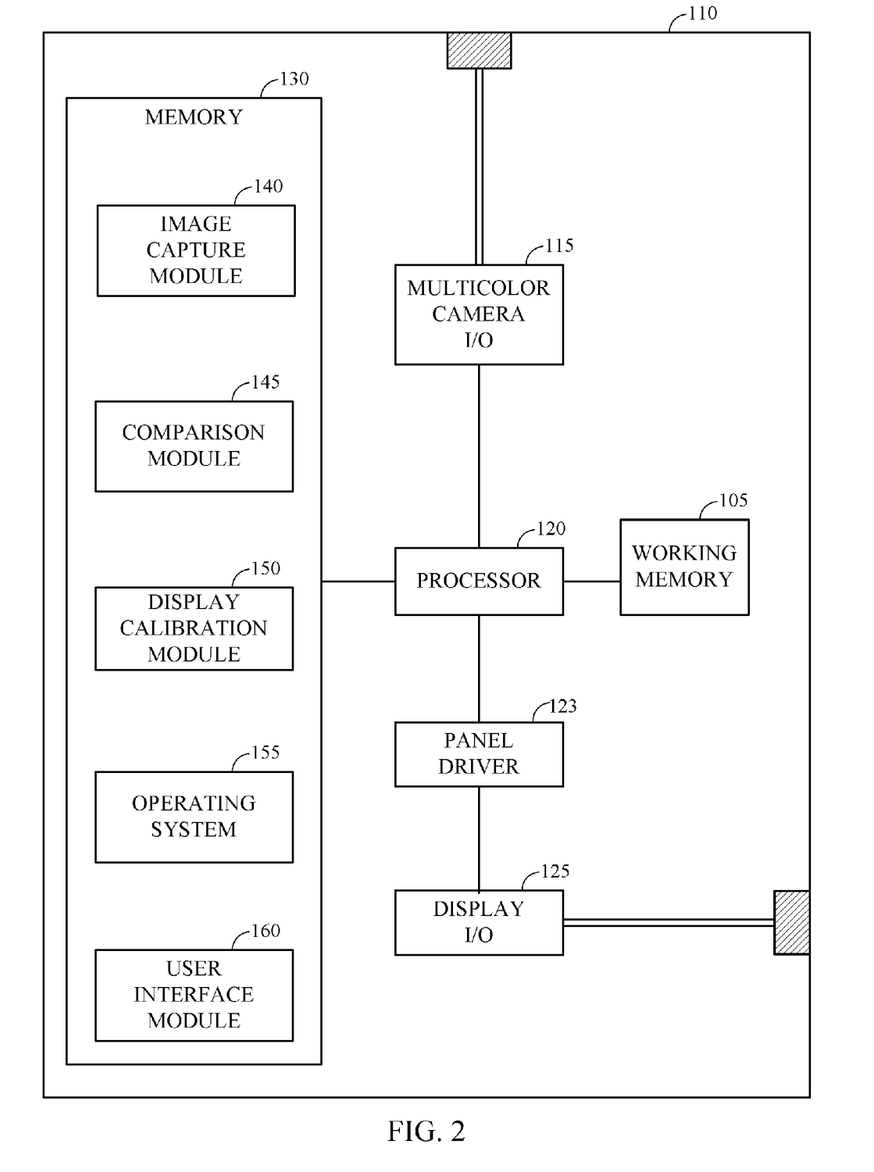
FIG. 2 is a block diagram depicting a device implementing some operative embodiments of the invention.

FIG. 2 depicts a high-level block diagram of the image analysis system 110 having a set of components including a processor 120 having a multicolor camera input/output 115, a panel driver 123 and display unit input/output 125. A working memory 105 and memory 130 are also in communication with the processor 120.

Processor 120 may be a general purpose processing unit or a processor specially designed for imaging applications. As shown, the processor 120 is connected to a memory 130 and a working memory 105. In the illustrated embodiment, the memory 130 stores an image capture module 140, a comparison module 145, a display calibration module 150, a user interface module 160, and operating system 155. These modules may include instructions that configure the processor 120 to perform various image processing and device management tasks. Working memory 105 may be used by processor 120 to store a working set of processor instructions contained in the modules of memory 130. Alternatively, working memory 105 may also be used by processor 120 to store dynamic data created during the operation of image analysis system 110.

As mentioned above, the processor 120 is configured by several modules stored in the memory 130. The image capture module 140 includes instructions that configure the processor 120 to capture images with the multicolor camera 114. Therefore, processor 120, along with image capture module 140, multicolor camera 114, and working memory 105 represent one means for capturing a multicolor image using a multicolor camera. The comparison module 145 provides instructions that configure the processor 120 to compare RGB values of the test color extracted from the captured image of the calibration test pattern and, through numerical processing, calculate XYZ coordinates of the test color. Color error is then measured between the calculated XYZ coordinate and the reference XYZ coordinates of a test color. The display calibration module 150 contains instructions that apply calibration changes to a display if the measured color error is not within acceptable color error limits. User interface module 160 includes instructions that configure the processor 120 to display information on an electronic display accessible to the user while running the image analysis system 110.

Operating system module 155 configures the processor 120 to manage the memory and processing resources of system 110. For example, operating system module 155 may include device drivers to manage hardware resources such as the display 125 or multicolor camera 115. Therefore, in some embodiments, instructions contained in the calibration modules discussed above may not interact with these hardware resources directly, but instead interact through standard subroutines or APIs located in operating system component 155. Instructions within operating system 155 may then interact directly with these hardware components.

Although FIG. 2 depicts a device comprising separate components to include a processor, multicolor camera, panel driver, display, and memory, one skilled in the art would recognize that these separate components may be combined in a variety of ways to achieve particular design objectives. For example, in an alternative embodiment, the memory components may be combined with processor components to save cost and improve performance.

Additionally, although FIG. 2 illustrates two memory components, including memory component 130 comprising several modules and a separate memory 105 comprising a working memory, one with skill in the art would recognize several embodiments utilizing different memory architectures. For example, a design may utilize ROM or static RAM memory for the storage of processor instructions implementing the modules contained in memory 130. Alternatively, processor instructions may be read at system startup from a disk storage device that is integrated into device 100 or connected via an external device port. The processor instructions may then be loaded into RAM to facilitate execution by the processor. For example, working memory 105 may be a RAM memory, with instructions loaded into working memory 105 before execution by the processor 120.

Figure 3:
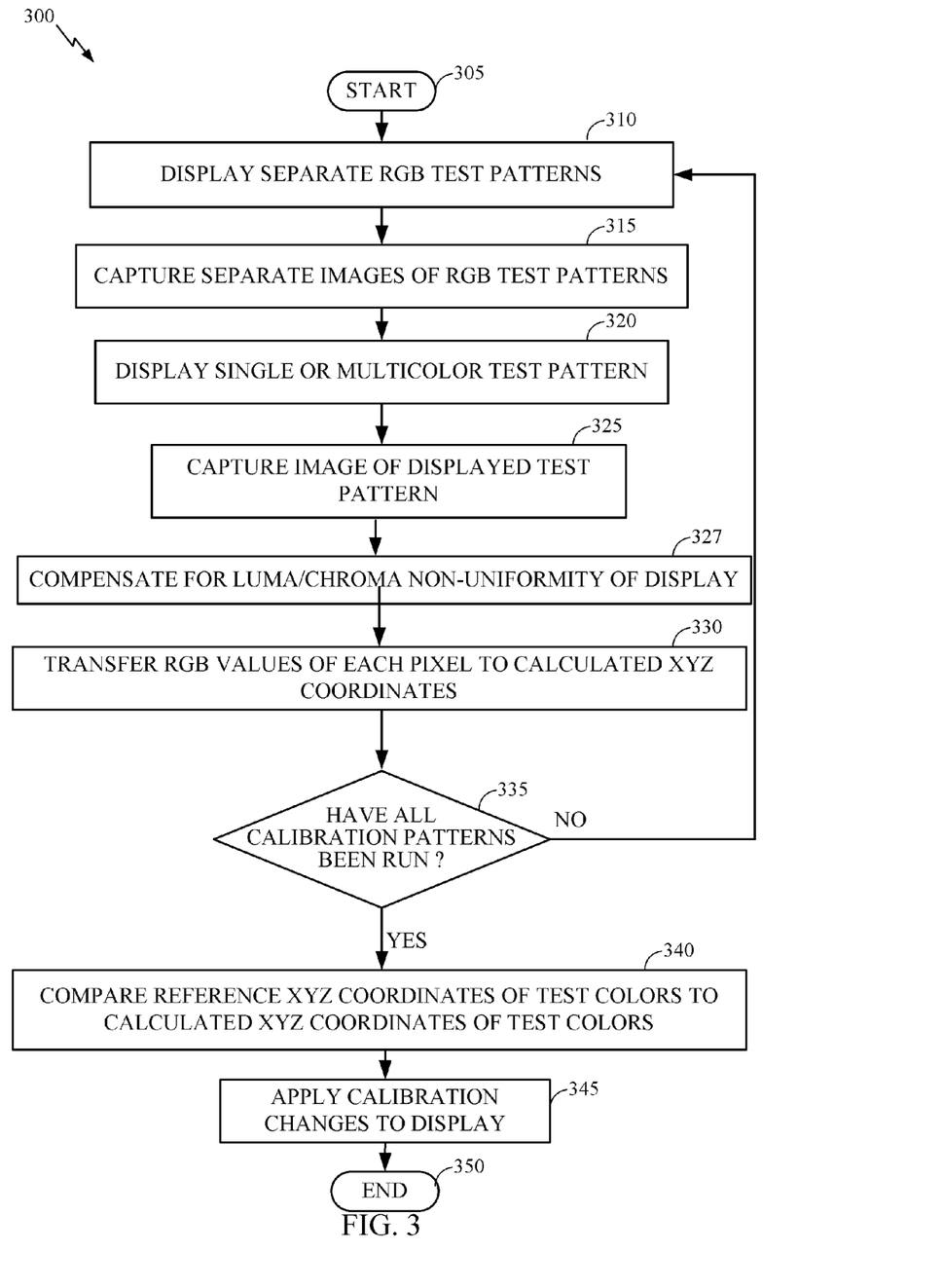
FIG. 3 is a flow chart depicting a process utilized in one embodiment of a calibration process.

FIG. 3 is a flow chart illustrating a numerical processing and display calibration process 300 that provides an overview of how display calibration can function in one embodiment. The process 300 begins at start block 305 and then transitions to block 310 when separate RGB test patterns are displayed on the display unit by panel driver 123. Process 300 then moves to block 315 where instructions direct that the multicolor camera capture separate image maps of the RGB test patterns. In this embodiment, three separate flat Red, Green and Blue test patterns are displayed and captured by the camera. Since the camera is fully colorimetrically calibrated in advance, the three separate captured images show luma and chroma non-uniformity of the panel being calibrated. Thus, these three images represent the luma/chroma non-uniformity of the display unit being calibrated.

Process 300 then moves to block 320 wherein instructions direct that a single or multicolor test pattern is displayed on the display unit by the panel driver 123. In one embodiment, the panel driver 123 directly communicates with a graphics processor in the device housing the electronic display under test. Process 300 then moves to block 325 where instructions within the image capture module 140 of FIG. 2 instruct the multicolor camera to capture an image of the display unit. Process 300 then moves to block 327 where instructions within the comparison module 145 of FIG. 2 compare RGB values of the test color extracted from the captured image of the calibration test pattern and the separate images of the RGB test and, through numerical processing, calculate XYZ coordinates of the test color or colors in order to compensate for the luma and chroma non-uniformity of the display unit.

The three image maps generated in block 315 are applied to the captured image in block 325 to compensate luma/chroma non-uniformity and thus accurately transfer RGB values for each pixel in the image captured by the camera in block 325 to absolute XYZ coordinates. Process 300 then moves to block 330 where instructions direct numerical processing to transfer RGB values of each pixel of the captured image of the test pattern to calculated XYZ coordinates. Process 300 then moves to decision block 335 wherein instructions are run to determine whether all calibration patterns have been run. If not all of the calibration patterns have been shown on the display unit, process 300 then returns to block 310 and repeats the process as described above. If all of the calibration test patterns have been displayed, process 300 moves to block 340 where instructions compare reference XYZ coordinates of the test colors displayed in the calibration patterns to the calculated XYZ coordinates of the test colors acquired from the captured images of the test patterns.

Within block 340, numerical processing (e.g., regression) is applied to two sets of XYZ coordinates: the reference XYZ coordinates of all test colors from a set of calibration patterns and the calculated/measured XYZ coordinates of the same set of test colors. Color error is then measured between the calculated XYZ coordinate and the reference XYZ coordinates of a test color. This step leads to a set of calibration data. Two sets of calibration data are generated: calibration data for gamma correction (i.e., luma/tone/gray tracking correction) and calibration data for chroma correction (i.e., color correction).

Process 300 then moves to block 345 in which calibration changes are applied to the display unit. For example, calibration changes can be applied by storing a calibration table to a memory in the display unit. Once all calibration changes have been applied to the display unit, Process 300 moves to block 350 and process 300 ends. In the described embodiment, all test colors were displayed and their XYZ coordinates were calculated and then desirably at one time all calculated test colors were compared with the reference test colors to generate all of the required correction for calibration of a display unit in the form of a set of calibration data. For luma, the correction will lead to 3 1D look up tables (LUTs) and for chroma the correction leads to a 3×11 polynomial color correction matrix.

Determining whether the captured image is within an acceptable color error for the particular display device can be performed by several methods. For example, a color response of the display may be performed by measuring reference color outputs for corresponding input reference linear color values. In one example, the colors of the so-called Macbeth color checker test chart are used as input to the device as the calibration pattern. The Macbeth color checker chart has 24 reference colors that include 18 colors and 6 achromatic neutral colors (white, grays, and black). In other examples, more precise results may be achieved by utilizing a larger number of reference colors, e.g., a color checker with 108 reference colors. A color measurement is then obtained using the multicolor camera.

The amount of color error produced by the display, or the error in the color response of the display, for each color input may be determined based on the difference between the measured output color and the corresponding input color reference indicated by the Macbeth color checker chart or other color checker reference. The human eye can typically detect color differences that exceed 2 delta e (CIE), as designated by the International Commission on Illumination (or Commission Internationale de l'Eclairage (CIE)). For example, two shades of a color may look the same to the human eye if the difference between them is 2 delta e (CIE) or less. During characterization or calibration of a display, the amount of difference between the input and output reference colors may be determined. The input and output reference colors may be expressed in terms of their RGB components.

In order to calibrate a display device wherein the color error is not within an acceptable range, the system may determine a color correction matrix for all the colors in the chart by well-known methods, such as the minimum square error (MSE) method.

Color correction for a 3CCD camera may be based on spectral data and processing. One example of a color correction matrix calculation for a 3CCD camera is discussed below. The Macbeth color checker chart (a set of 24 reference colors) may be used to do color calibration. Spectral data for the 24 colors are based on 20 samples of Macbeth color checker charts. These spectral data are based on the 380 nm-730 nm range.

Integrated R/G/B values for the 24 colors under a given illumination source can be calculated using the following equations:

$$R=\Sigma(I(\lambda)*R(\lambda)*S_R(\lambda))$$

$$G=\Sigma(I(\lambda)*R(\lambda)*S_G(\lambda))$$

$$B=\Sigma(I(\lambda)*R(\lambda)*S_B(\lambda))$$

In these equations, $I(\lambda)$ represents spectral power distribution (SPD) of an illumination source, $R(\lambda)$ represents the spectral reflectance factors (SRF) of each color and $S(\lambda)$ represents spectral response (SR) of the camera for a specific color channel. Color no. 19 in the Macbeth color checker chart represents a reflectance surface with ~90% reflectance index. This color may be used as a reference for scaling integrated RGB values.

Integration and summation of the above three equations are done for the visible range of wavelengths ($\lambda$: 360 nm to 720 nm—with 10 nm wavelength resolution).

Integrated CIE tristimulus values X/Y/Z for the 24 colors under a given illumination source can be calculated using the following equations:

$$X=\Sigma(I(\lambda)*R(\lambda)*x(\lambda))$$

$$Y=\Sigma(I(\lambda)*R(\lambda)*y(\lambda))$$

$$Z=\Sigma(I(\lambda)*R(\lambda)*z(\lambda))$$

As was indicated earlier, $I(\lambda)$ represents the spectral power distribution (SPD) of an illumination source and $R(\lambda)$ represents the spectral reflectance factors (SRF) of each color. Furthermore, $x(\lambda)$, $y(\lambda)$ and $z(\lambda)$ represent Color Matching Functions.

A third-order polynomial model with 17 terms is defined for each channel to map camera RGB values to CIE tristimulus values X/Y/Z:

$$X=k_{00}R+k_{01}G+k_{02}B+k_{03}RG+k_{04}GB+k_{05}BR+k_{06}R^2+k_{07}G^2+k_{08}B^2+k_{09}RGB+k_{010}R^2G+k_{011}R^2B+k_{012}G^2B+k_{013}G^2B+k_{014}B^2R+k_{015}B^2G+k_{016}$$

$$Y=k_{10}R+k_{11}G+k_{12}B+k_{13}RG+k_{14}GB+k_{15}BR+k_{16}R^2+k_{17}G^2+k_{18}B^2+k_{19}RGB+k_{110}R^2G+k_{111}R^2B+k_{112}G^2B+k_{113}G^2B+k_{114}B^2R+k_{115}B^2G+k_{116}$$

$$Z=k_{20}R+k_{21}G+k_{22}B+k_{23}RG+k_{24}GB+k_{25}BR+k_{26}R^2+k_{27}G^2+k_{28}B^2+k_{29}RGB+k_{210}R^2G+k_{211}R^2B+k_{212}G^2B+k_{213}G^2B+k_{214}B^2R+k_{215}B^2G+k_{216}$$

Here, $k_{ij}$ represent 17 coefficients of the polynomial model; R, G and B represent camera integrated RGB responses; and X, Y and Z represent CIE tristimulus values. It is noted that although this is a non-linear model with all $2^{nd}$ and $3^{rd}$ order terms, its solution is based on linear regression. Least Squared Error (LSE) method is used to solve for the 51(3×17) unknown coefficients $k_{ij}$.

The equations above can be re-arranged and expressed in matrix form as shown below:

$$\begin{vmatrix} X \\ Y \\ Z \end{vmatrix} = \begin{vmatrix} k00 & \cdots & k016 \\ \cdots & \cdots & \cdots \\ k20 & \cdots & k216 \end{vmatrix} * |D|$$

where transpose of matrix [D] is defined as:

$$[D]^T=[R\ G\ B\ RG\ GB\ BR\ R^2\ G^2\ B^2\ RGB\ R^2G\ R^2B\ G^2R\ G^2B\ B^2R\ B^2G\ 1]$$

To solve for the 51 unknown coefficients, a minimum of 17 reference colors is required. However, higher number of reference colors is used to achieve more accurate calculation of [3×17] color correction/mapping matrix. The Macbeth color checker chart provides 24 reference colors (6 of which are achromatic).

For color-error estimation, color error metric DE2000 may be applied. To establish the optimal polynomial for color correction/mapping matrix, the following eight cases were tested:

| CC Matrix Size | Polynomial Terms |
|---|---|
| 3 × 3 | R G B |
| 3 × 4 | R G B 1 |
| 3 × 5 | R G RGB 1 |
| 3 × 7 | R G B RG GB BR 1 |
| 3 × 8 | R G B RG GB BR RGB 1 |
| 3 × 10 | R G B RG GB BR $R^2$ $G^2$ $B^2$ 1 |
| 3 × 11 | R G B RG GB BR $R^2$ $G^2$ $B^2$ RGB 1 |
| 3 × 17 | R G B RG GB BR $R^2$ $G^2$ $B^2$ RGB $R^2$G $R^2$B $G^2$R $G^2$B $B^2$R $B^2$G 1 |

| CC Matrix Size | DE2000 Color Error | |
|---|---|---|
| | Average | Max |
| 3 × 3 | 1.23 | 4.62 |
| 3 × 4 | 1.47 | 4.87 |
| 3 × 5 | 1.39 | 4.37 |
| 3 × 7 | 1.09 | 3.57 |
| 3 × 8 | 0.99 | 3.51 |
| 3 × 10 | 0.91 | 3.37 |
| 3 × 11 | 0.88 | 3.32 |
| 3 × 17 | 0.34 | 0.99 |

The data in the table above indicates that the third-order polynomial model with 17 terms (represented by a 3×17 matrix) provides accurate color correction for the 3CCD camera. That is, for this example, maximum color error is below 1 DE2000 CIE unit while average color error is about ⅓ of DE2000 CIE unit.

Aspects of the invention are not limited to a particular way of performing color correction, or a particular sized matrix of stored RGB value coefficients. For example, as shown above, embodiments of the system use a 3×17 polynomial color correction to spectrally calibrate a 3CCD camera. In some examples, the correction values may be expressed as coefficient values that provide color corrected RGB values ($R_{cie}$ $G_{cie}$ $B_{cie}$). The coefficients may be used in linear or polynomial regression equations to obtain color corrected RGB values from input RGB values ($R_d$ $G_d$ $B_d$). The coefficients may be stored as a 3 by N matrix, where N is 3 or more. When N is 3, linear regression may be used to obtain color corrected RGB values from input RGB values. The example equations below may represent one example of a 3 by 4 matrix that can be solved during color calibration, and then applied (based on the solved values for coefficients k) for color adjustment or correction during operation of the device.

$$R_{cie}=k_{rr}*R_d+k_{rg}*G_d+k_{rb}*B_d$$

$$G_{cie}=k_{gr}*R_d+k_{gg}*G_d+k_{gb}*B_d$$

$$B_{cie}=k_{br}*R_d+k_{bg}*G_d+k_{bb}*B_d$$

where the $k_i$ coefficients represent the color correction coefficients based on the performed calibration as discussed above. $R_d$, $G_d$, $B_d$ represent the display RGB values, and $R_{cie}$, $G_{cie}$, $B_{cie}$ represent the color corrected values. Each of the coefficients is associated with the one-channel contributions, or, the contribution of each of the red (R), green (G), and blue (B) channels alone. Therefore, $k_{rr}$ is the coefficient associated with the red channel contribution to the color-corrected red channel value, $k_{rg}$ is associated with the green channel contribution to the color-corrected red channel value, and $k_{rb}$ is associated with the blue channel contribution to the color-corrected red channel value.

Similarly, $k_{gr}$, $k_{gg}$, and $k_{gb}$ are the coefficients associated with the red, green, and blue channel contributions to the color-corrected green channel value, respectively, and $k_{br}$, $k_{bg}$, and $k_{bb}$ are the coefficients associated with the red, green, and blue channel contributions to the color-corrected blue channel value, respectively.

Moreover, experimental measurements of the output of the display device measured by the multicolor camera relative to the input reference colors from the generated calibration pattern can be used to experimentally determine the desired coefficients. Moreover, a different set of coefficients may be solved for each of a plurality of different backlight settings for the device during the calibration process. This way, a different color correction matrix may be defined for each of a plurality of different backlight settings for the device (although some settings may apply the same matrix if the same adjustments are adequate for both backlight settings). The matrices can be stored in memory associated with the display device.

Verification of the characterization and calibration of the color response of a display panel may be then performed by inputting the reference colors (e.g., the colors of the Macbeth chart), applying the appropriate color correction matrix determined during the characterization and calibration process and measuring the corresponding color outputs.

Figure 4:
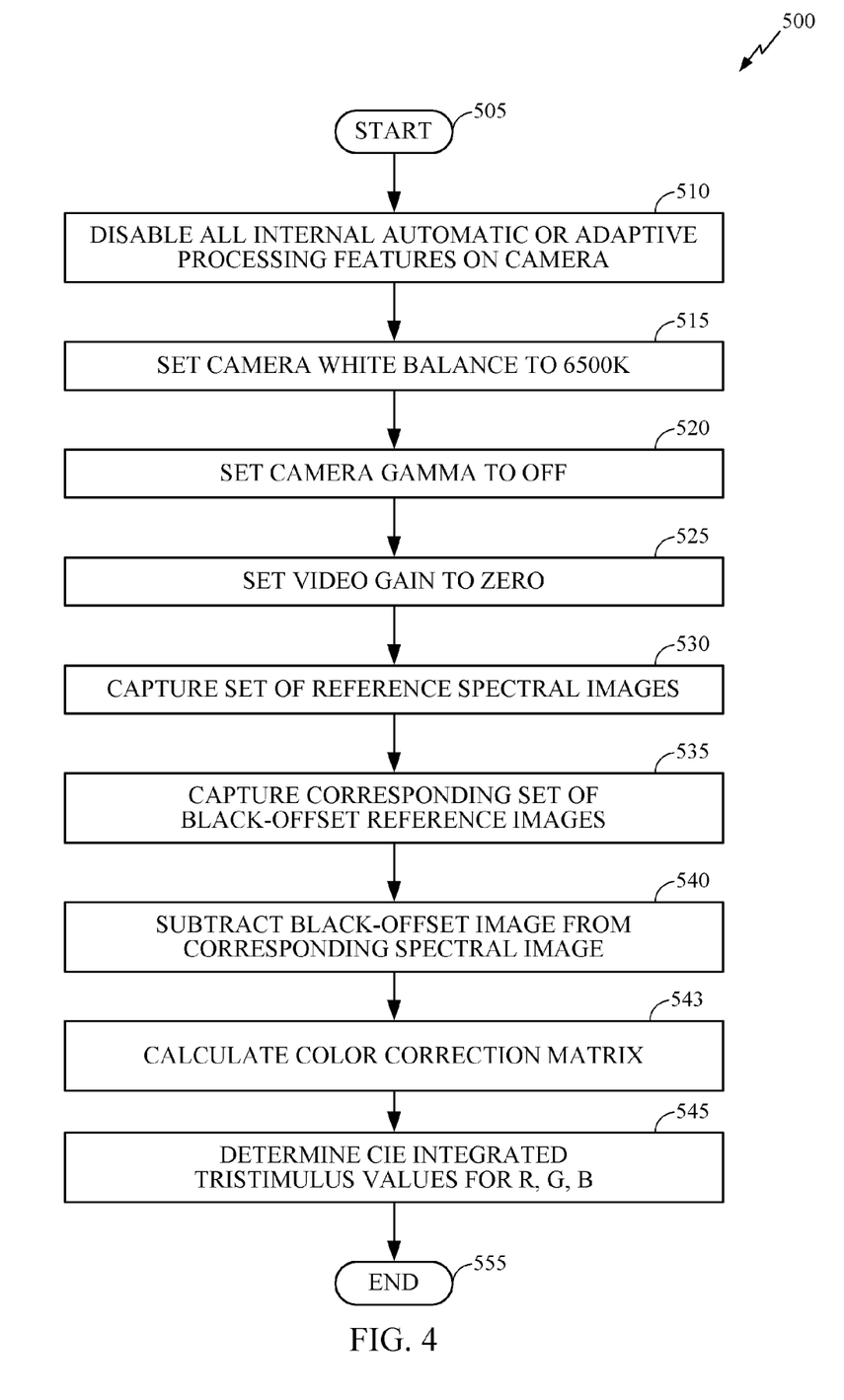
FIG. 4 is a flow chart depicting one embodiment of a process used to calibrate a multicolor camera.

FIG. 4 is a flow chart illustrating a camera calibration process 500 that runs within one embodiment of the image capture module 140 of FIG. 2. This process is used to calibrate the camera that is used to capture the images on an electronic display so that the camera is known to be reading accurate color measurements on the display. The process 500 begins at start block 505 and transitions to block 510 where all internal automatic or adaptive processing features are disabled on a multicolor camera. Process 500 then moves to block 515 where instructions set the white balance of the multicolor camera desirably to 6500 K. Process 500 then moves to block 520 where the gamma of the multicolor camera is turned off. Process 500 then moves to block 525 where the video gain of the multicolor camera is set to zero. Process 500 then moves to block 530 where instructions direct the multicolor camera to capture a set of reference spectral images. Using a monochromator and an integrating sphere, a set of flat fields with predefined wavelengths (from 380 nm to 720 nm) may be generated in the field of view of the 3CCD camera. Process 500 then moves to block 535 where instructions direct the multicolor camera to capture a corresponding set of black-offset reference images. Process 500 then moves to block 540 where instructions determine the difference between the reference spectral images and the black-offset images by subtracting the black-offset images from the corresponding spectral images. At this point, the RGB spectral responses of the 3CCD camera are established as the first portion of the colorimetric calibration of the 3CCD camera. The process of colorimetric calibration of the 3CCD camera continues with calculation of the color error matrix in block 543, as described above. Process 500 then moves to block 545 where instructions determine the CIE integrated tristimulus values for three colors, R, G, and B. Process 500 then moves to block 555 and ends.

The above-described process 500 illustrates one embodiment of a spectral-based calibration of a multicolor camera for use in calibrating a display unit. To achieve a high degree of accuracy in the calibration of a display unit, it is preferable to perform colorimetric calibration of a camera based on the spectral method, as illustrated in process 500.

In one embodiment, the luma and chroma non-uniformity of the display unit are established prior to calibration of the display unit. For example, if two red color patches are displayed at the center and the corner of a display, the two patches may not have the same luminance and the same absolute color coordinates XYZ. Therefore, it is desirable to establish the non-uniformity of the display prior to using the spectrally-calibrated camera to measure multiple colors within the same displayed calibration pattern.

As discussed above, the multicolor camera may have three separate Red, Green and Blue CCD sensors. Therefore, there is desirably no RGB color cross-talk between the channels which would lead to inaccurate color measurements. Furthermore, the camera settings can be established such that RGB lens fall off is minimal and insignificant.

In one embodiment, three separate Red, Green and Blue test patterns are displayed on a display unit and three images are captured by the spectrally-calibrated multicolor camera. Due to the features and settings of the multicolor camera described above, the three images show the luma and chroma spatial non-uniformity for the three Red, Green and Blue channels. Any subsequent images of a generated calibration test pattern displayed on a display unit that are captured by the spectrally-calibrated multicolor camera can then be corrected or compensated using the luma and chroma non-uniformity images discussed above. When a calibration test pattern includes multiple colors, each color will be at a different location on the display unit and thus the luma and chroma non-uniformity of the display unit will affect the displayed color. Use of the luma and chroma non-uniformity images enable the system to correct the measured luma and chroma of the set of test colors and thus allows the generation of accurate color measurement of a set of colors simultaneously.

Those having skill in the art will further appreciate that the various illustrative logical blocks, modules, circuits, and process blocks described in connection with the implementations disclosed herein may be implemented as electronic hardware, computer software, or combinations of both. To clearly illustrate this interchangeability of hardware and software, various illustrative components, blocks, modules, circuits, and blocks have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention. One skilled in the art will recognize that a portion, or a part, may comprise something less than, or equal to, a whole. For example, a portion of a collection of pixels may refer to a sub-collection of those pixels.

The various illustrative logical blocks, modules, and circuits described in connection with the implementations disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The blocks of a method or process described in connection with the implementations disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of non-transitory storage medium known in the art. An exemplary computer-readable storage medium is coupled to the processor such that the processor can read information from, and write information to, the computer-readable storage medium. In the alternative, the storage medium may be integral to the processor. The processor and the storage medium may reside in an ASIC. The ASIC may reside in a user terminal, camera, or other device. In the alternative, the processor and the storage medium may reside as discrete components in a user terminal, camera, or other device.

The previous description of the disclosed implementations is provided to enable any person skilled in the art to make or use the present invention. Various modifications to these implementations will be readily apparent to those skilled in the art, and the generic principles defined herein may be applied to other implementations without departing from the spirit or scope of the invention. Thus, the present invention is not intended to be limited to the implementations shown herein but is to be accorded the widest scope consistent with the principles and novel features disclosed herein.

What is claimed is:

1. An electronic method for calibrating a display unit, the method comprising:
    displaying a multicolor calibration pattern image on a display unit;
    capturing the multicolor calibration pattern image displayed on the display unit with a multicolor colorimetrically calibrated camera having a plurality of image sensors, with each image sensor configured to capture a predetermined color of light;
    comparing a set of reference absolute XYZ coordinates of a set of colors from the multicolor calibration pattern with a set of measured XYZ color coordinates captured using the colorimetrically calibrated camera; and
    calibrating the display unit based on the comparison between the reference coordinates and the measured coordinates.

2. The method of claim 1, further comprising the step of determining whether the comparison between the reference absolute XYZ coordinates of a set of colors and the measured XYZ color coordinates is within acceptable color error.

3. The method of claim 2, wherein acceptable color error is less than 1 CIE DE2000 unit.

4. The method of claim 1, further comprising the step of performing a spectral-based calibration of the multicolor camera.

5. The method of claim 1, wherein the multicolor calibration pattern image comprises a plurality of single color images.

6. The method of claim 1, wherein the method may be performed in less than 5 seconds.

7. The method of claim 1, wherein the colorimetrically calibrated camera comprises separate image sensors configured to capture red, green and blue light.

8. The method of claim 1, wherein displaying a multicolor calibration pattern image on a display unit comprises instructing a graphics processor in the display unit to display preselected pixel colors.

9. A system for calibrating a display unit, comprising:
    a colorimetrically calibrated multicolor camera configured to capture red, green, and blue colors on separate image sensors, with each image sensor configured to capture a predetermined color of light;
    a panel driver configured to generate multicolor pattern images on a display unit being calibrated; and
    a calibration module configured to set calibration values to adjust the colors being shown on the display.

10. The system of claim 9, further comprising a comparison module configured to compare a set of reference absolute XYZ coordinates of a set of test colors with a corresponding set of measured XYZ color coordinates captured using a colorimetrically calibrated camera and determine whether an acceptable color error is achieved.

11. The system of claim 10, wherein the acceptable color error is less than 1 DE2000 CIE unit.

12. The system of claim 10, further comprising an image capture module configured to spectrally calibrate a multicolor camera prior to capturing color pattern images on a display unit.

13. The system of claim 10, wherein the multicolor camera comprises a 3CCD camera.

14. The system of claim 10, wherein the panel driver is configured to communicate with a graphics processor in the display unit being calibrated.

15. The system of claim 10, wherein the calibration module is configured to store a matrix of calibration coefficients in the display unit.

16. A non-transitory computer-readable medium containing processor executable instructions that when executed perform a method comprising:
    displaying a multicolor calibration pattern image on a display unit;
    capturing the multicolor calibration pattern image displayed on the display unit with a colorimetrically calibrated multicolor camera having a plurality of image sensors, with each image sensor configured to capture a predetermined color of light;
    comparing reference absolute XYZ coordinates of a set of colors with a set of measured XYZ color coordinates captured using the colorimetrically calibrated camera; and
    calibrating the display unit based on the comparison between the reference coordinates and the measured coordinates.

17. The computer readable medium of claim 16, further containing processor executable instructions that when executed perform a method of determining whether the reference absolute XYZ coordinates of a set of colors with the measured XYZ color coordinates captured using a colorimetrically calibrated camera is within acceptable color error.

18. The computer readable medium of claim 16, further containing processor executable instructions that when executed perform a method of performing a spectral-based calibration of the multicolor camera.

19. The computer readable medium of claim 16, wherein the computer readable medium comprises instructions for calibrating the display unit by storing a matrix of calibration coefficients in the display unit.

20. A system for calibrating a display unit, comprising:
- means for displaying a multicolor calibration pattern image on a display unit;
- means for capturing the multicolor calibration pattern image displayed on the display unit with a colorimetrically calibrated multicolor camera having a plurality of image sensors, with each image sensor configured to capture a predetermined color of light;
- means for comparing reference absolute XYZ coordinates of a set of colors with a set of measured XYZ color coordinates captured using the colorimetrically calibrated camera; and
- means for calibrating the display unit based on the comparison between the reference coordinates and the measured coordinates.

* * * * *